United States Patent [19]
Brown et al.

[11] Patent Number: 6,160,851
[45] Date of Patent: Dec. 12, 2000

[54] LINE DRIVER CALIBRATION CIRCUIT

[75] Inventors: Gary A. Brown, Fremont; Jitendra Mohan, Palo Alto, both of Calif.

[73] Assignee: National Semiconductor Corporation, Santa Clara, Calif.

[21] Appl. No.: 09/032,547

[22] Filed: Feb. 26, 1998

[51] Int. Cl.[7] .................................................. H04B 17/00
[52] U.S. Cl. ......................... 375/254; 375/257; 375/377; 333/19; 333/177; 333/178
[58] Field of Search ................................... 375/257, 258, 375/224, 377, 219, 220, 318, 317, 319; 333/19, 20, 177, 178; 379/5, 27, 28; 326/22, 23, 24, 26

[56] References Cited

U.S. PATENT DOCUMENTS

| | | | |
|---|---|---|---|
| 5,315,597 | 5/1994 | Yang et al. | 371/20.1 |
| 5,541,957 | 7/1996 | Lau | 375/258 |
| 5,764,394 | 7/1998 | Yamazaki et al. | 359/152 |
| 5,784,573 | 7/1998 | Szczepanek et al. | 395/200.8 |

*Primary Examiner*—Stephen Chin
*Assistant Examiner*—Dac V. Ha

[57] ABSTRACT

A calibration circuit adjusts a differential output voltage from a line driver circuit when the differential output voltage falls outside a specified tolerance range. The calibration circuit includes a sample and hold circuit which samples the differential output voltage and holds a representative signal. A comparator compares the held signal with a reference voltage signal. When the held signal is greater than the reference voltage signal the comparator outputs a LOW signal and when the held signal is less than the reference voltage signal the comparator outputs a HIGH signal. The comparator output signal is stored in a memory circuit of a control logic. The control logic instructs an up/down counter to increment when the comparator output is LOW and to decrement when the comparator output is HIGH. A calibration current source sinks a unit of calibration current when the comparator output is LOW and sources a unit of calibration current when the comparator output is HIGH. The calibration current is added to an input current to calibrate the differential output voltage towards the specified tolerance range. In a next cycle of the calibration sequence, if a new comparator output signal is different from that stored in the memory circuit, the calibration sequence ceases. However, if the new comparator output signal is the same as that stored in the memory circuit the calibration sequence continues.

19 Claims, 5 Drawing Sheets

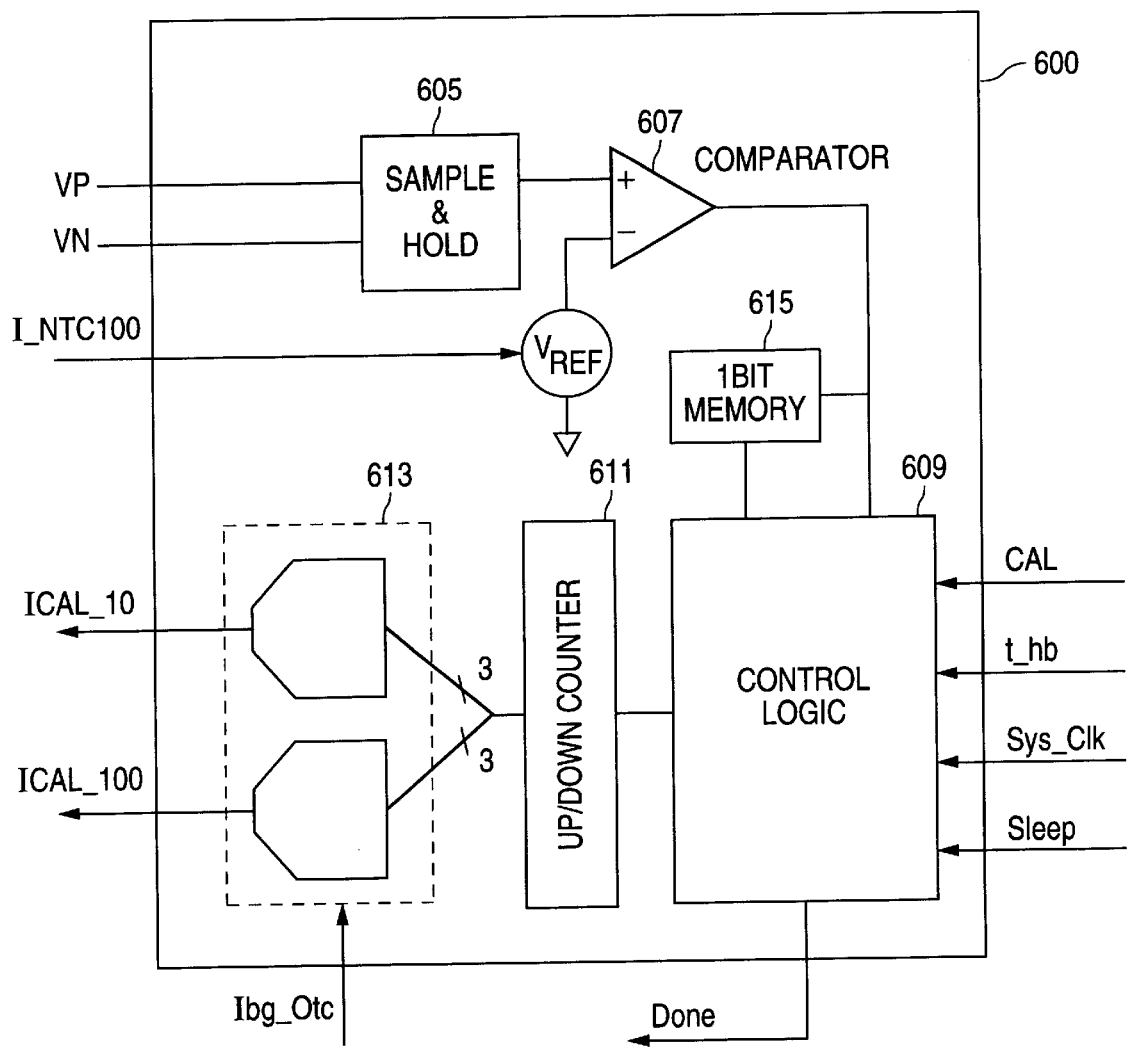
FIG. 6
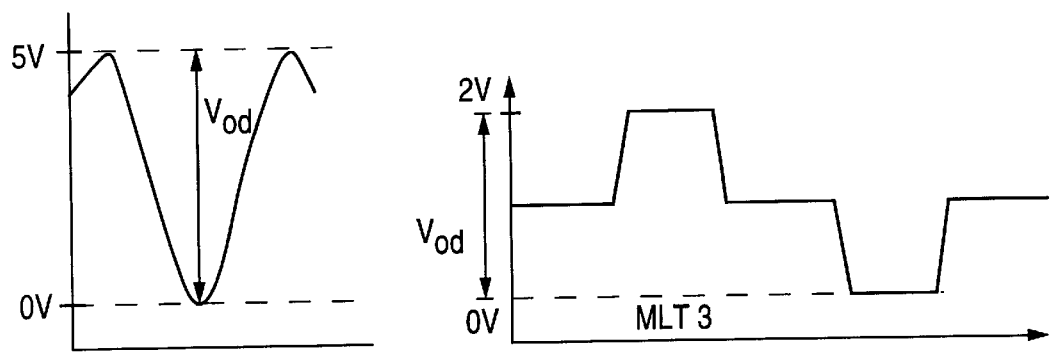
FIG. 7A   FIG. 7B

LINE DRIVER CALIBRATION CIRCUIT

BACKGROUND OF THE INVENTION

1. Field of the Invention

The present invention relates to the field of local area network communications, and in particular, to line drivers in local area networks.

2. Related Art

A local-area network ("LAN") is a communication system that enables personal computers, work stations, file servers, repeaters, data terminal equipment ("DTE"), and other such information processing equipment located within a limited geographical area such as an office, a building, or a cluster of buildings to electronically transfer information among one another. Each piece of information processing equipment in the LAN communicates with other information processing equipment in the LAN by following a fixed protocol (or standard) which defines the network operation. Information processing equipment made by different suppliers can thus be readily incorporated into the LAN.

The ISO Open Systems Interconnection Basic Reference Model defines a seven-layer model for data communication in a LAN. The lowest layer in the model is the physical layer which consists of modules that specify (a) the physical media which interconnects the network nodes and over which data is to be electronically transmitted, (b) the manner in which the network nodes interface to the physical transmission media, (c) the process for transferring data over the physical media, and (d) the protocol of the data stream.

IEEE Standard 802.3, Carrier Sense Multiple Access with Collision Detection (CSMA/CD) Access Method and Physical Layer Specifications, is one of the most widely used standards for the physical layer. Commonly referred to as Ethernet, IEEE Standard 802.3 deals with transferring data over twisted-pair cables or co-axial cables. The 10 Base-T protocol of IEEE Standard 802.3 prescribes a rate of 10 megabits/second ("Mbps") for transferring data over twisted-pair cables.

The constant need to transfer more information faster, accompanied by increases in data processing capability, necessitated an expansion to data transfer rates considerably higher than the 10-Mbps rate prescribed by the 10 Base-T protocol. As a consequence, a protocol referred to as 100 Base-T was developed for extending IEEE Standard 802.3 to accommodate data moving at an effective transfer rate of 100 Mbps through twisted-pair cables. Under the 100 Base-T protocol, certain control bits are incorporated into the data before it is placed on a twisted-pair cable. The result is that the data and control signals actually move through a twisted-pair cable at 125 Mbps.

In expanding IEEE Standard 802.3 to the 100 Base-T protocol, there are various situations in which it is desirable that the transmitter be capable of using one driver to transmit data at both the 100 Base-T rate and the lower 10 Base-T rate. Accordingly, is it preferable to use a line driver capable of driving both 10 Base-T and 100 Base-T signaling.

In particular, one set of information processing equipment should be capable of driving data moving at the 10 Mbps ("Meg") rate or the 100 Meg rate without having to make any adjustments when the data transfer rate changes from 10 Meg to 100 Meg and vice versa.

FIG. 1 illustrates the data transmit path 100 of communication in the LAN operating in 100 Base-T. During data transmission, a communication unit operating on the LAN, such as a computer 117, generates a data signal T1 which is converted into differential form for transmission on the twisted pair cable 103. For 10 Base-T transmission, this data signal T1 is Manchester coded 101 to reduce electromagnetic interference and to produce square wave pulses. These pulses are then filtered 101 such that the square wave pulses are basically sinusoidal waves. These waves then go through a waveshaping filter to generate filtered differential data signals T1+/−.

In this description a pair of differential signals means two signals whose current waveforms are out of phase with one another. The individual signals of a pair of differential signals are indicated by reference symbols respectively ending with "+" and "−" notation—e.g., S+ and S−. The composite notation "+/−" is employed to indicate both differential signals using a single reference symbol—e.g., S+/−.

For 100 Meg transmission, scramble and filter 119 scrambles data signal T1 and converts data signal T1 to differential format. Encoder 121 MLT-3 codes the data signal to generate trinary differential signals T2+/−. A 10 Meg amplifier signal driver 107 and a 100 Meg amplifier signal driver 109 take these differential signals T1+/− and T2+/−, respectively, and generate voltage-sourced differential signals T10+/− and T20+/− respectively, to drive a primary load 105 and to transmit them on twisted pair cable 103.

Transformer 111 has a primary winding 111A and a secondary winding 111B which isolate the twisted-pair cable 103 from the circuitry producing the transmit signals. Primary winding 111A terminates at a primary load 105 and secondary winding 111B terminates at a secondary load 113. Secondary load 113 couples to a connecting unit 115, which couples to twisted-pair cable 103. Primary winding 111A couples to a resistive load 105. It is across this resistive load 105 that either sine wave 10 Base-T signaling or MLT-3 100 Base-T signaling must be created.

Line drivers can handle either transfer rates of 10 Meg and 100 Meg, or both 10 Meg and 100 Meg. However, all of these line drivers have the disadvantage that often the differential output voltage falls outside a specified tolerance range, causing the line driver circuit to be ineffective. Such inaccuracy may result due to some of the components of the line driver circuits have excess circuit variations, such as circuit errors, component errors, transformer errors, and inaccurate load resistor values.

Thus, a need exists to correct the differential output voltage occurring in both 10 Meg and 100 Meg line drivers when the differential output voltage falls outside the specified tolerance range.

SUMMARY OF INVENTION

A calibration circuit having high efficiency and a short calibration cycle time, calibrates both 10 Meg and 100 Meg line drivers to meet specifications on components of the line driver that have excess process variations.

In general, a reference current from a current source drives the line driver circuit. When the differential output voltage from the line driver circuit falls outside a specified tolerance range, the calibration circuit outputs a calibration current which is added to the reference current to calibrate the differential output voltage towards the specified tolerance range. A negative calibration current is output when the differential output voltage is above the specified tolerance range to decrease the amount of current input to the line driver circuit. In contrast, a positive calibration current is output when the differential output voltage is below the specified tolerance range to increase the amount of current input to the line driver circuit. Such adjustment of the amount of current input to the line driver circuit, calibrates the differential output voltage towards the specified tolerance range. In this way, the calibration circuit enhances the yield of the line driver by correcting for errors which cause the line driver to marginally fail the differential output voltage specification.

A calibration circuit in accordance with an embodiment of the present invention includes a sample and hold circuit, a comparator, a memory circuit, a control logic circuit, an up/down counter, and a calibration current source. The sample and hold circuit samples the differential output voltage signal output by the line driver circuit, and holds a signal representative of the differential output voltage signal. A comparator compares the held signal with a reference voltage signal, where the magnitude of the reference voltage signal corresponds to the desired magnitude of the differential output voltage signal. The comparator outputs a flag when the magnitude of the differential output voltage signal transcends the magnitude of the reference voltage signal. When the differential output voltage is greater than the reference voltage, the comparator output is HIGH and when the differential output voltage is less than the reference voltage, the comparator output is LOW. This comparator output is stored in the memory circuit and the calibration sequence begins.

The N-bit up/down counter counts either up or down depending upon the comparator output stored in the memory circuit. When the comparator output is HIGH, the control logic circuit sends a signal to the up/down counter to count backwards by decrementing the least significant bit of the up/down counter. When the comparator output is LOW, the control logic circuit sends a signal to the up/down counter to count forward by incrementing the least significant bit of the up/down counter. An N-bit digital word output by the up/down counter is received by the calibration current source and then converted to a calibration current which corresponds to the N-bit digital word. The calibration current is negative when the up/down counter counts backwards and positive when the up/down counter counts forwards. The calibration current is added to the reference current input to the line driver circuit. Thus, the calibration current either increases or decreases the amount of current input to the line driver circuit to adjust the differential output voltage towards the specified tolerance range, and the calibration sequence repeats.

The sample and hold circuit holds a new signal representative of the adjusted differential output signal. The comparator compares the held value with the reference voltage and outputs either a HIGH or LOW signal depending on whether the new differential output voltage is greater than or less than the reference voltage. If the comparator output from this latest cycle is different than the comparator output stored in the memory circuit from the previous cycle, then the calibration sequence ceases. However, if the comparator output from this latest cycle is the same as the comparator output stored in the memory circuit, then the calibration sequence continues. As the number of cycles in the calibration sequence increase, the count from the up/down counter incrementally increases or decreases depending upon the signal from the control logic circuit, and the calibration current incrementally increases or decreases in step sizes which correspond to the output of the up/down counter. The calibration sequence continues until the comparator output changes at which point the up/down counter stops. The up/down counter output will then be a digital representation of the input analog voltage.

A calibration in accordance with an alternate embodiment of the present invention also includes a waveshaper. The waveshaper changes the waveforms of the input current signals which are then passed on to the line driver circuit.

By increasing or decreasing the calibration current, the total current input to the line driver can be increased or decreased until the differential output voltage is within the specified tolerance range. As a result, when the differential output voltage falls outside the specified tolerance range due to circuit errors, the calibration circuit can correct the differential output voltage by way of the calibration sequence.

These and other features and advantages of the present invention will be understood upon consideration of the following detailed description of the invention and the accompanying drawings.

BRIEF DESCRIPTION OF THE DRAWINGS

FIG. 6 is a functional block diagram of an alternate embodiment of a calibration circuit in accordance with the present invention.

FIGS. 7A and 7B are exemplary signal waveforms in accordance with an embodiment of the present invention.

Like reference symbols are employed in the drawings and in the description of the preferred embodiments to represent the same or similar items.

DETAILED DESCRIPTION OF THE INVENTION

Figure 1:
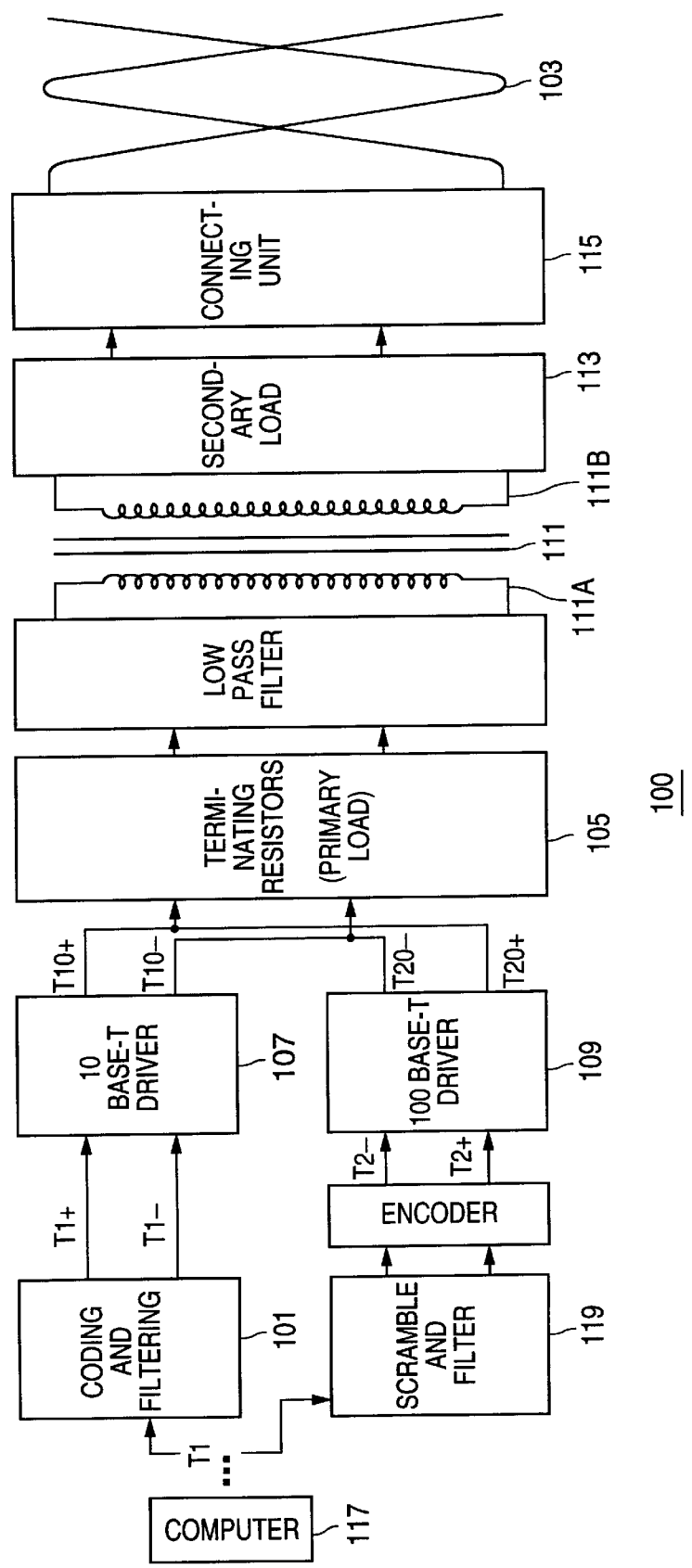
FIG. 1 shows a conventional LAN system configuration including a voltage amplifier driver.
Figure 2:
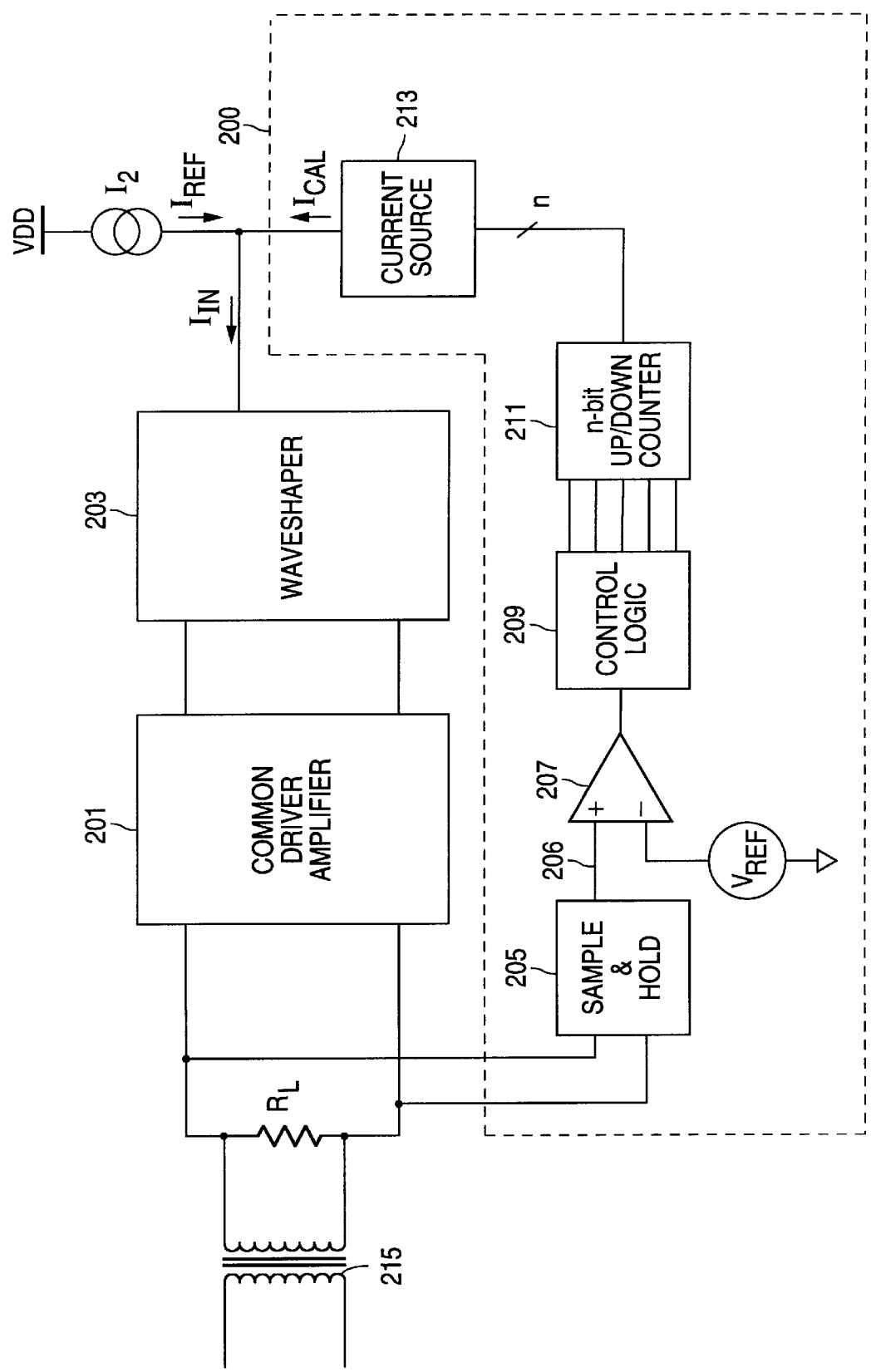
FIG. 2 is a functional block diagram of an embodiment of a calibration circuit in accordance with the present invention.

In accordance with an illustrative embodiment of the invention, a common driver calibration circuit 200 and a current mode driver amplifier 201 capable of operating in both 10 Meg and 100 Meg mode are shown in FIG. 2. A transformer 215 isolates the twisted-pair cable (not shown) from the circuitry producing the transmit signals. Isolation transformer 215 has a primary winding and a secondary winding. The secondary winding terminates at the twisted-pair cable (not shown), which has a characteristic impedance of 100 ohms. In this embodiment, the primary side of the transformer terminates at a load resistor $R_L$ having an impedance of 100 ohms to match the 100 ohm characteristic impedance of the twisted-pair cable. It is across this resistor that either 10 Base-T sine wave signaling or 100 Base-T MLT-3 signaling must be created. These signaling waves are replicated across resistor load $R_L$ by generating a voltage Vod across resistor $R_L$.

$$Vod = A_i * IIN * R_L$$

where Vod is the differential output voltage of the common driver amplifier 201 across resistor $R_L$, $A_i$ is the gain of the signal, IIN is the input current, and $R_L$ is the resistance of the load.

Common driver calibration circuit 200 is used to calibrate differential output voltage Vod to meet specifications on parts that have excessive process variations. By correcting errors in those devices that marginally fail the differential output voltage Vod specification, common driver calibration circuit 200 enhances the yield of the common driver amplifier 201. This enhancement is achieved by utilizing both analog and digital circuitry to adjust an input current IIN of the common driver amplifier 201 being calibrated. It will be appreciated that the common driver calibration circuit 200 operates with either a 10 Meg or 100 Meg common driver amplifier 201.

As shown in the detailed block diagram of FIG. 2, common driver calibration circuit 200 is separate from common driver amplifier 201. Calibration circuit 200 comprises a sample and hold circuit 205, a comparator circuit 207, a control logic circuit 209, an N-bit up/down counter 211, and a calibration current source 213.

Current IIN comprises current IREF from constant current source I2 and calibration current ICAL from calibration current source 213. Current IIN flows into waveshaper 203 which typically comprises an digital-to-analog converter (DAC). Waveshaper 203 changes the waveforms of the current input signal IIN which are then passed on to the common driver amplifier 201. Common driver amplifier 201 amplifies the waveforms shaped by waveshaper 203, and drives transformer 215 and resistive load $R_L$.

Calibration circuit 200 adjusts current IIN by increasing or decreasing the calibration current ICAL to calibrate common driver amplifier 201. Thus, when process variations occur which typically would otherwise cause the differential output voltage Vod to fail to meet the tolerance specifications, common driver calibration circuit 200 varies calibration current ICAL to adjust the current IIN such that differential output voltage Vod is corrected to be within the specified tolerance range.

Figure 3:
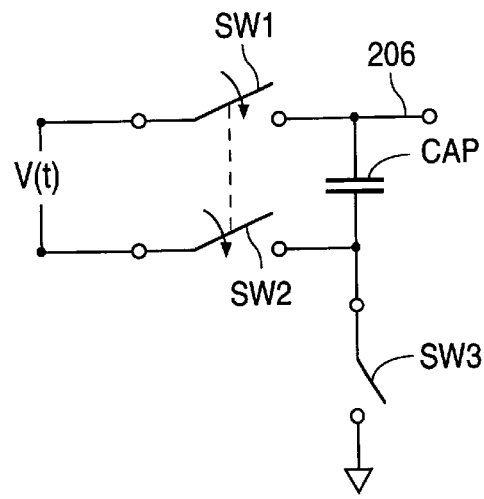
FIG. 3 is a schematic diagram of a sample and hold circuit included in the calibration circuit in accordance with the present invention.

In operation, initially N-bit up/down counter 211 is set to a zero reference such that no calibration current ICAL is output from calibration current source 213. Control logic circuit 211 sends a pulse instructing common driver amplifier 201 to output the current which comprises differential output voltage Vod. In this way, control logic circuit 211 determines whether to initiate a calibration sequence. To monitor and calibrate differential output voltage Vod, sample and hold circuit 205 samples differential output voltage Vod. One embodiment of sample and hold circuit 205 is illustrated in FIG. 3. As shown, sample and hold circuit 205 comprises three switches SW1–SW3, such as metal oxide semiconductor field effect semiconductors (MOSFETs), and a storage capacitor CAP. During the sampling intervals, switches SW1 and SW2 close to conduct, while switch SW3 opens so that voltage is stored on storage capacitor CAP. Between the sampling intervals are the hold intervals, during which switches SW1–SW2 open and switch SW3 closes. The voltage level on capacitor CAP represents the signal samples of differential output voltage Vod. Each of theses voltage levels is then fed to the input of comparator circuit 207.

Comparator circuit 207 compares the held signal value 206 with a known reference voltage VREF, which corresponds to the preferred value of differential output voltage Vod. When differential output voltage Vod transcends reference voltage VREF comparator circuit 207 outputs a comparator signal. For example, when differential output voltage Vod is greater than reference voltage VREF, the output of comparator circuit 207 is HIGH, and when differential output voltage Vod is less than reference voltage VREF, the output of comparator circuit 207 is LOW. The comparator output is stored in a one-bit memory contained in control logic circuit 209 and the calibration sequence begins. It will be appreciated that control logic circuit 209 can comprise a simple device such as a state machine, or a more complex device such as a microcontroller.

Control logic circuit 209 processes the comparator output to provide N bits of an output digital word, and sends the information to N-bit up/down counter 211. The digital portion of the calibration circuit 200 counts either up or down depending on the comparator output stored in the memory of the control logic circuit 209, and typically counts only one bit at a time. For example, when the comparator output is LOW because differential output voltage Vod is less than reference voltage VREF, control logic circuit 209 increments N-bit up/down counter 211 by one. As a result, the calibration current source 213 outputs a positive calibration current ICAL. However, when the comparator output is HIGH because differential output voltage Vod is greater than reference voltage VREF, control logic circuit 209 decrements N-bit up/down counter 211 by one. As a result, calibration current source outputs a negative calibration current ICAL.

When N-bit up/down counter 211 is incremented or decremented by the least significant bit (LSB) after a count is made, the calibration current ICAL output from calibration current source 213 increases or decreases, respectively, by a particular step size. By adjusting calibration current ICAL in this way, the amount of current IIN supplied to the common driver amplifier 201 to generate differential output voltage Vod can be increased or decreased.

The adjusted differential output voltage Vod output from common driver amplifier 201 is sampled and held again. Then, comparator circuit 207 again compares the held signal of the adjusted differential output voltage Vod. The decision as to whether to continue calibrating is made depending on the new comparator output. When the new comparator output is different from the comparator output stored in the memory of control logic circuit 209, then common driver amplifier 201 is sufficiently calibrated and the calibration sequence ceases. For example, if the new comparator output is HIGH instead of LOW, the calibration sequence ceases. However, if the comparator output is the same, for example, comparator circuit 207 continues to output a HIGH signal, then the calibration sequence continues. N-bit up/down counter 211 continues to increment or decrement by the least significant bit thereby instructing calibration current source 213 to increase or decrease calibration current ICAL in multiples of a particular step size. The calibration sequence continues until the comparator output is different from that stored in the memory of control logic circuit 209.

The operation of N-bit up/down counter and calibration current source 213 will be explained more fully with reference to FIG. 2 and to the exemplary embodiments of N-bit up/down counter 211 and calibration current source 213 shown in FIGS. 4 and 5, respectively.

Referring to FIG. 2, in general, N-bit up/down counter 211 generates an N-bit digital output that controls calibration current ICAL output by calibration current source 213. In particular, calibration current source 213 receives the N-bit digital output from N-bit up/down counter 211, and converts the N-bit digital output to a corresponding current signal. The maximum input count received by calibration current source 213, i.e., all bits set to one, is $2^n-1$. Thus, initially, with a 0 (zero) count in N-bit up/down counter 211, the output of calibration current source is 0 (zero). If in the next cycle, the output of comparator circuit 207 is LOW, instructing N-bit up/down counter 211 to count the clock pulses in the up direction, a positive calibration current ICAL having a particular step size, is output from calibration current source 213.

As the number of cycles in the calibration sequence increases, the count from N-bit up/down counter 211 incrementally increases. And, with each incremental increase in the count from N-bit up/down counter 211, the calibration current ICAL output from calibration current source 213 steps up by a particular step size. The process continues until the comparator output changes, at which point N-bit up/down counter 211 stops. The output of N-bit up/down counter 211 will then be a digital representation of the input analog voltage. Thus, this calibration circuit 200 rapidly tracks the incremental changes in the input signal IIN. In this way, the output from calibration current source 213 is controlled by N-bit up/down counter 211.

Figure 4:
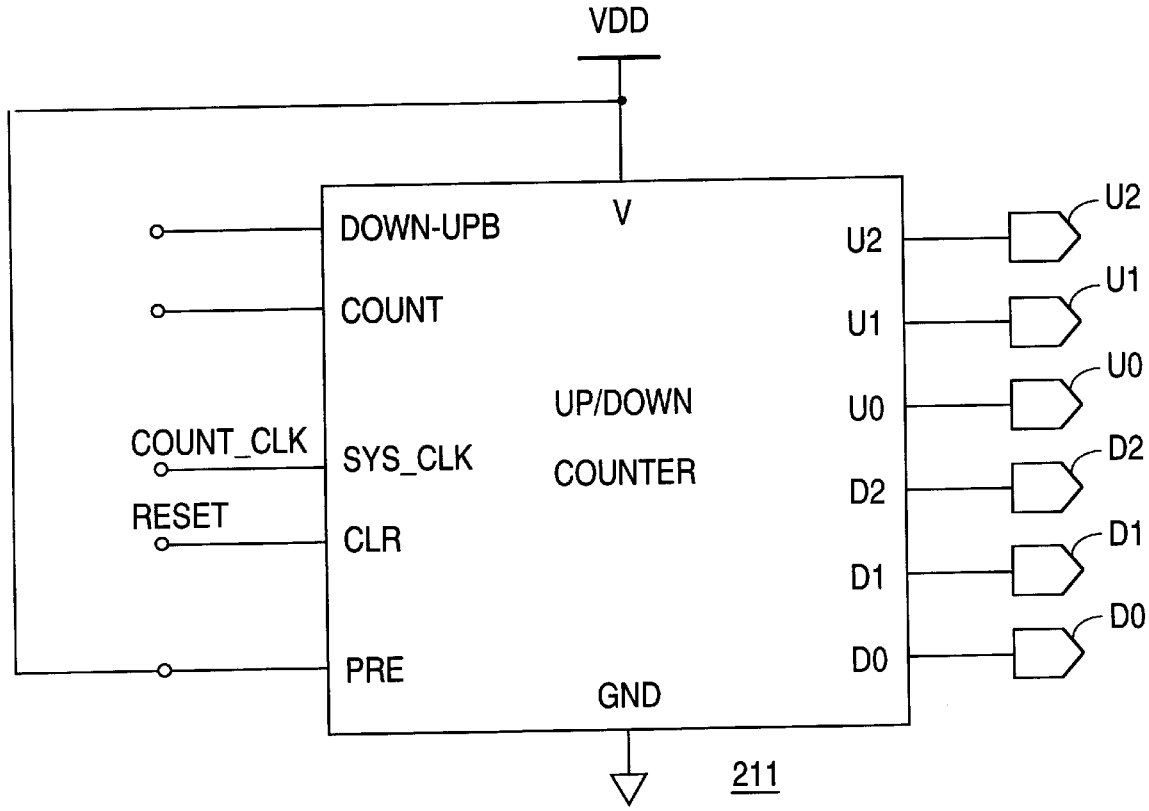
FIG. 4 is a functional block diagram of an N-bit up/down counter included in the calibration circuit in accordance with the present invention.

As shown in FIG. 4, N-bit up/down counter 211 is a 6-bit up/down counter 211 having outputs U0–U2 and D0–D2 enabling up/down counter 211 to count 3 bits UP and 3 bits DOWN. Clear input CLR clears up/down counter 211 upon receiving a reset signal, and predetermined input PRE sets up/down counter 211 to a predetermined state. Count input COUNT receives signals from both comparator circuit 207 and the memory circuit within control logic circuit 209, such that both circuits can instruct up/down counter 211 to count. Thus, for example, if count input COUNT receives a HIGH signal then up/down counter 211 begins counting, but if a LOW signal is received then up/down counter 211 does not count. The up/down counter 211 also has a system clock SYS_CLK input which receives a count clock Count_Clk signal, and a control input DOWN_UPB which receives a signal from comparator circuit 207. If control input DOWN_UPB receives a HIGH signal then up/down counter 211 goes through a normal counting sequence whereas if control input DOWN_UPB receives a LOW signal then up/down counter 211 counts backward.

Figure 5:
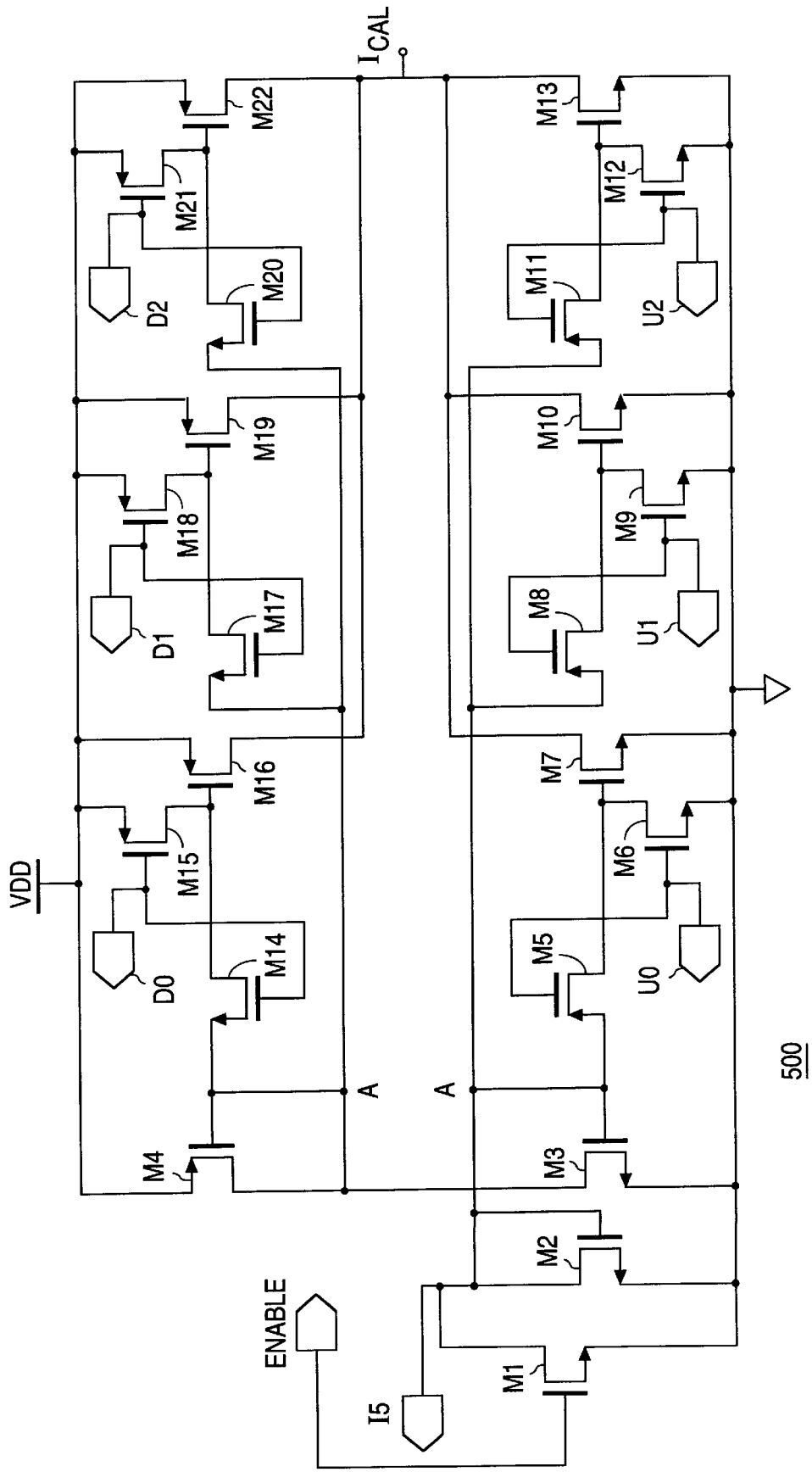
FIG. 5 is a schematic diagram of a calibration current source included in the calibration circuit in accordance with the present invention.

Calibration current source 213 is shown in FIG. 5 as programmable current source 500. An enable signal ENABLE enables the programmable current source 500 when the enable signal is HIGH, thus turning on transistor M1. The outputs U0–U2 and D0–D2 from up/down counter 211 are the inputs to programmable current source 500 and turn transistors M5–M22, ON and OFF.

The size, W/L where W is the width of the channel and L is the length of the channel, of each of transistors M7, M10, M13, M16, M19 and M22 are selected so as to generate a binary-scaled step output current. For example, transistors M7 and M16 are sized the smallest, transistors M10 and M19 are sized to generate twice as much current as transistors M6 and M15, and transistors M13 and M22 are sized to generate four times as much current as transistors M7 and M16. As a result, the sizes of transistors M7, M10, M13, M16, M19 and M22 are selected such that the current generated provides a binary-scaled output current.

Reference current 15 is input to programmable current source 500 through diode connected transistor M2 which generates a voltage at node A. This voltage turns ON N-channel MOS (NMOS) M3 which establishes the current through P-channel MOS (PMOS) M4. At this point, there is a reference voltage at the top and the bottom of programmable current source 500. Thus, programmable current source 500 is always ON, and its operation depends on whether outputs U0–U2 and D0–D2 from counter 211 are LOW or HIGH.

In this example, since a 6-bit up/down counter 211 is used, up/down counter 211 can deliver 0–7 bits in the positive or negative direction, to programmable current source 500. Prior to the initiation of the calibration sequence, counter outputs D0–D2 are set to 0 (zero) and counter outputs U0–U1 are set to 1 (one), such that up/down counter 211 is at zero reference.

The following describes a cycle in the calibration sequence when the output from comparator circuit 207 is HIGH, indicating differential voltage Vod is greater than reference voltage VREF. Control logic circuit 209 decrements up/down counter 500 by one by decreasing the least significant bit of up/down counter 211. In this example, counter output U0 changes from HIGH to LOW causing PMOS M5 to turn ON and NMOS M6 to turn OFF. The voltage is passed through PMOS M5 to turn ON NMOS M7 which sinks one unit of current thereby decreasing the amount of current IIN flowing into waveshaper 203.

If in the next calibration cycle the output of comparator circuit 207 is still HIGH, because differential voltage Vod is still greater than reference voltage VREF, control logic circuit 209 again decrements up/down counter 211 by one. Thus, counter output U0 changes from LOW to HIGH turning OFF NMOS M7, and counter output U1 changes from HIGH to LOW causing PMOS M8 to turn ON and NMOS M9 to turn OFF. The voltage is passed through PMOS M8 to turn ON NMOS M10 which sinks two units of current thereby further decreasing the amount of current IIN flowing into waveshaper 203. The calibration sequence continues in these decremental current unit steps corresponding to decrements of the least significant bit of the up/down counter 211, until the output of comparator circuit 207 changes from HIGH to LOW.

Operation of up/down counter 211 and programmable current source 500 will now be discussed as if the output from comparator circuit 207 were LOW, indicating that differential output voltage Vod was less than reference voltage VREF. Control logic circuit 209 increments up/down counter 211 by the least significant bit. Thus, counter output D0 changes from LOW to HIGH causing NMOS M14 to turn ON and PMOS M15 to turn OFF. Since the output of PMOS M15 is coupled to the input of PMOS M16, when PMOS M15 turns OFF the low signal turns ON PMOS M16 which sources one unit of current thereby increasing the amount of current IIN flowing into waveshaper 203.

If the output of comparator circuit 207 is still LOW, because differential output voltage Vod is still less than reference voltage VREF, control logic circuit 209 again increments up/down counter 211 by one. Thus, counter output D0 changes from HIGH to LOW and counter output D1 changes from LOW to HIGH. The change in counter output D0 causes PMOS M15 to turn ON thereby turning OFF PMOS M16. The change in counter output D1 causes NMOS M17 to turn ON and PMOS M18 to turn OFF. Since the output of PMOS M18 is coupled to the input of PMOS M19, when PMOS M18 turns OFF the low signal turns ON PMOS M19 which sources two units of current thereby further increasing the amount of current IIN flowing into waveshaper 203. The calibration sequence continues in these incremental current unit steps corresponding to increments of the least significant bit of the up/down counter 211, until the output of comparator circuit 207 changes from LOW to HIGH. Thus, in this embodiment programmable current source 500 sinks current when counter outputs U0–U2 go low to decrease the amount of input current IIN, and sources current when counter outputs D0–D2 go high to increase the amount of input current IIN.

The following exemplary calibration sequence is explained with reference to FIG. 6. Calibration circuit 600 is controlled by control logic circuit 609 which has a 25 Meg system clock signal Sys_Clk. As mentioned above, the calibration circuit in accordance with the present invention calibrates a common amplifier driver which operates in either the 10 Meg mode or the 100 Meg mode. Calibration circuit 600 is selected to operate in 10 Meg calibrate mode when signal t_hb input to is set to 1 and in 100 Meg calibrate mode when signal t_hb input to is set to 0. Once the calibration mode is selected, a HIGH calibrate signal CAL will start the calibration process. In this exemplary embodiment, control logic circuit 609 also has a sleep signal SLEEP which when HIGH, sets calibration circuit 600 to sleep mode.

Calibration circuit 600 also comprises 6-bit up/down counter 611. However, it will be appreciated that any N-bit up/down counter can be used. The more bits the up/down counter uses, the higher the resolution.

Since calibration circuit 600 operates in either the 10 Meg or 100 Meg mode, calibration current source 613 generates either a 10 Meg calibration current Ical_10 or a 100 Meg calibration current Ical_100. In this exemplary embodiment, the reference current input to calibration current source 613 is a 100 microampere temperature compensated bandgap current Ibg_0tc.

In this exemplary embodiment, calibration circuit 600 is selected to operate in the 10 Meg calibrate mode and the specification tolerance range for differential output voltage Vod is 5.0 V ±600 mV. Thus, reference voltage VREF is set to 5.0 V. For purposes of this exemplary embodiment, common driver amplifier 201 (FIG. 2) has a gain of 200 and current waveshaper 203 has a gain of 2.5. Thus, the differential output voltage Vod is calculated as follows.

$$Vod = Acd * Aws * R_L * (Iref + Ical\_0) \quad (1)$$

Where Acd is the gain from common driver amplifier 201 and Aws is the gain from current waveshaper 203, $R_L$ is the resistive load and has a value of 50 ohms, Iref is the current from constant current source I2 and has a value of 200 µA, and Ical_10 is the calibration current from calibration current source 613.

Calibration current Ical_10 from calibration current source 613 is measured as follows:

$$Ical\_10 = \pm 3 \, \mu A * (2^n - 1) \quad (2)$$

Where ±3 µA is a predetermined current step size and n is the number of bits of the digital word output by 6-bit up/down counter 611. It will be appreciated that although ±3 µA is selected as the predetermined current step size in this exemplary embodiment, other current step sizes can be used. Thus, $$Ical\_10 = 21 \, \mu A$$

When equation (2) and the values given above are substituted into equation (1):

$$Vod = 200 * 2.5 * 50 * (200 \, \mu A \pm 3 \, \mu A * (2^3 - 1)) \quad (3)$$

$$Vod = 5V \pm 525 \, mV$$

Thus, the value of the change in differential output voltage is:

$$\Delta V = Acd * Aws * R_L * Ical\_10 \quad (4)$$

When equation (2) and the values given above are substituted into equation (4):

$$\Delta V = 200 * 2.5 * 50 * \pm 3 \, \mu A * (2^3 1 \, 1)$$

$$\Delta V = \pm 525 \, mV$$

Thus, in this exemplary embodiment, calibration circuit 600 can calibrate a component that is up to 525 mV out of the specified tolerance range. In addition to allowing a total calibration of ±525 mV, since a 6-bit up/down counter is used, common driver amplifier 201 is calibrated in 75 mV steps. An example of the 10 Meg differential voltage output Vod waveform is shown in FIG. 7A.

In operation sample and hold circuit 605 samples voltage signals Vp, Vn output by line driver 201 and holds a signal representative of the voltage signals Vp, Vn. Comparator circuit 607 compares the held signal with reference voltage VREF, which is set to 5.0 V. In this exemplary embodiment, a 100 microampere bandgap current I_NTC100 is input to a reference voltage circuit (not shown) to generate reference voltage VREF.

When the held signal is less than reference voltage VREF, comparator circuit 607 outputs a HIGH signal. This HIGH comparator output signal is stored in one-bit memory circuit 615. Control logic circuit 609 then instructs 6-bit up/down counter 611 to count backwards by the least significant bit, which in turn instructs calibration current source 613 to output the 21 microampere calibration current Ical_10. This calibration current is added to reference current IREF and input to waveshaper 203 and then line driver 201. As a result, differential output voltage Vod is increased by a 75 millivolt step.

The new differential output voltage Vod is again sampled by sample and hold circuit 605 and a signal representative of the new differential output voltage Vod is held. Comparator circuit 607 compares this new held voltage with reference voltage VREF. If the held voltage is no longer less than reference voltage VREF of 5.0 V ±600 mV, then comparator circuit 607 outputs a LOW signal. Logic control circuit 609 compares this new comparator output signal with the previous comparator output signal stored in one-bit memory 615. Since the new comparator output signal is different from the stored comparator output signal, control logic circuit 609 sets the output signal DONE to 0 (zero) to indicate the calibrating is complete. After calibration, a reset signal can be used to start a new calibration cycle.

In another embodiment, the calibration circuit 600 is selected in 100 Meg calibrate mode. In this exemplary embodiment, the tolerance range specification for differential output voltage Vod is 2.0 V ±200 mV. An example of the 100 Meg differential voltage output Vod waveform is shown in FIG. 7B. In this 100 Meg calibrate mode, calibration circuit 600 operates similar to that in the 10 Meg calibrate mode, however, waveshaper 203 is not needed. Thus, the different output voltage Vod is measured as follows:

$$Vod = R_L * A_{cd100} * I_{REF100} * 2 \quad (5)$$

Where $A_{cd100}$ is the gain from the common driver amplifier 201 when it operates in the 100 Meg mode and $I_{REF100}$ is the current from constant current source I2 when it operates in the 100 Meg mode, and the factor of 2 (two) is used in the equation to account for the positive and negative side of the waveform. For purposes of this exemplary embodiment, the value of $I_{REF100}$ is 200 microamperes, the value of $A_{cd100}$ is 105 and the value of $R_L$ is 50 ohms. Substituting these values in equation (1), this yields a differential output voltage Vod of 2.1 V.

The change in the differential output voltage Vod is equal to the following:

$$\Delta V = R_L * A_{cd100} * Ical\_100 * 2 \quad (6)$$

Substituting equation (2) into equation (6) and using the values provided above, change in differential output voltage Vod is equal to:

$$\Delta V = 50 * 105 * 3 \, \mu A * (2^m - 1) * 2$$

$$\Delta V = 220.5 \text{ mV}$$

In this exemplary embodiment, since a 6-bit up/down counter is used, the calibration of calibration circuit 600 is incremented in 31.5 mV steps and allows for a total calibration of ±220.5 mV. The operation of calibration circuit 100 in 100 Meg mode is analogous to that in the 10 Meg mode. After calibration, a reset signal can be used to start a new calibration cycle.

In addition to being capable of calibrating both 10 Meg and 100 Meg common driver amplifiers, calibration circuit 600 also provides 3 bit accuracy, uses very low power after the calibration cycle is complete, and has a short calibration cycle time. In the exemplary embodiment discussed above, the calibration cycle time is less than approximately 2 (two) microseconds.

Various other modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. An apparatus including a calibration circuit for calibrating an output signal from a line driver, the calibration circuit comprising:
   a sample and hold circuit configured to sample an output signal from a line driver circuit and hold a signal representative of the output signal;
   a comparator circuit coupled to the sample and hold circuit and configured to compare the held signal from the sample and hold circuit with a reference signal and generate a comparator signal indicating when the held signal transcends the reference signal;
   a control circuit coupled to comparator circuit and configured to receive the comparator signal and in accordance therewith generate a control signal; and
   a current source circuit coupled to the control circuit and configured to receive the control signal and in accordance therewith generate a calibration signal for combining with an input signal to the line driver circuit to calibrate the line driver circuit output signal with respect to the reference signal.

2. The apparatus of claim 1 wherein the control circuit comprises:
   a counter coupled between the control circuit and the current source and configured to receive the control signal and in accordance therewith increment a predetermined amount when the held signal transcends the reference signal in a first direction and decrement the predetermined amount when the held signal transcends the reference signal in a second direction, wherein the calibration signal corresponds to the predetermined amount.

3. The apparatus of claim 1, wherein the control circuit comprises:
   a memory circuit coupled to the comparator circuit and the control circuit and configured to store the comparator signal, wherein when a magnitude of the stored comparator signal has a first state in a first calibration cycle and a magnitude of the comparator signal has a second state in a second calibration cycle, a calibration sequence stops.

4. The apparatus of claim 2, wherein the counter comprises an N-bit up/down counter.

5. The apparatus of claim 1 further comprising a waveshaper coupled to the current source.

6. The apparatus of claim 1 wherein the current source comprises a digital to analog converter.

7. The apparatus of claim 1, wherein the calibration circuit operates with a 100 Meg line driver and a 10 Meg line driver.

8. An apparatus including a calibration circuit for calibrating an output signal from a line driver, the calibration circuit comprising:
   a sample and hold circuit configured to sample an output signal from a line driver amplifier circuit and hold a signal representative of the output signal;
   a comparator circuit coupled to the sample and hold circuit and configured to compare the held signal from the sample and hold circuit with a reference signal and generate a comparator signal indicating when the held signal transcends the reference signal, the comparator signal having a first comparator state when the held signal transcends the reference signal in a first direction and a second comparator state when the held signal transcends the reference signal in a second direction;
   a memory circuit coupled to the comparator circuit and configured to store the present comparator signal and in accordance therewith provide a stored comparator signal;
   a control circuit coupled to the comparator circuit and the memory circuit and configured to receive the comparator signal and in accordance therewith generate a control signal having a first control state when the comparator signal has the first comparator state, and a second control state when the comparator signal has the second comparator state;
   an up/down counter coupled to the control circuit and configured to receive the control signal and in accordance therewith increment a predetermined amount when the control signal has the first control state and decrement the predetermined amount when the control signal has the second control state; and
   a current source circuit coupled to the up/down counter and configured to generate a calibration signal corresponding to the predetermined amount,
      wherein the calibration signal has a first polarity when the held signal transcends the reference signal in a first direction and an opposite polarity when the held signal transcends the reference signal in a second direction, and
      wherein the calibration signal is combined with an input signal to the line driver amplifier circuit to calibrate the line drive amplifier circuit output signal with respect to the reference signal.

9. A method of calibrating a line driver circuit, the method including the steps of:
   sampling an output signal from a line driver circuit;
   holding a sampled signal representative of the output signal from the line driver;
   comparing a magnitude of the held signal representative of the output signal with a magnitude of a reference signal;
   generating a calibration signal when the magnitude of the held signal transcends the reference signal; and
   combining the calibration signal to an input signal to the line driver to calibrate a magnitude of the output signal with respect to the magnitude of the reference signal.

10. The method of claim 9, wherein the step of generating a calibration signal when the magnitude of the held signal transcends the reference signal comprises generating a calibration signal having a first polarity when the magnitude of the held signal transcends the reference signal in a first direction and having an opposite polarity when the held value transcends the reference signal in a second direction.

11. The method of claim 9 wherein the step of generating a calibration signal when the magnitude of the held signal transcends the reference signal comprises the steps of:
   incrementing a counter a predetermined amount when the magnitude of the held signal representative of the output signal transcends the magnitude of the reference signal in a first direction and decrementing the counter the predetermined amount when the magnitude of the held signal representative of the output signal transcends the magnitude of the reference signal in a second direction; and
   generating a calibration signal with a first polarity when the counter is incremented and an opposite polarity when the counter is decremented, wherein the calibration signal corresponds to the predetermined amount.

12. The method of claim 11 wherein the step of incrementing a counter a predetermined amount when the magnitude of the held signal representative of the output signal transcends the magnitude of the reference signal in a first direction and decrementing the counter the predetermined amount when the magnitude of the held signal representative of the output signal transcends the magnitude of the reference signal in a second direction comprises the step of incrementing an up/down counter by a least significant bit when the magnitude of the held signal representative of the output signal transcends the magnitude of the reference signal in the first direction and decrementing the counter by the least significant bit when the magnitude of the held signal representative of the output signal transcends the magnitude of the reference signal in the second direction.

13. The method of claim 9 further comprising the step of resetting a calibration cycle.

14. The method of claim 9 further comprising the step of selecting one of a 10 Meg calibrate mode and a 100 Meg calibrate mode.

15. The method of claim 9 further comprising the steps of:
   setting a flag to a first state when the magnitude of the held signal transcends the magnitude of the reference signal in a first direction and to a second state when the magnitude of the held signal transcends the magnitude of the reference signal in a second direction, to generate an initial flag state and initiate a calibration sequence; and
   storing the initial flag state.

16. The method of claim 15 further comprising the steps of:
   generating an adjusted output signal from the line driver, wherein when the calibration signal is added to the input signal to the line driver to calibrate the magnitude of the output signal with respect to the magnitude of the reference signal the adjusted output signal is the output from the line driver;
   setting the flag to the first state when the magnitude of the adjusted output signal transcends the magnitude of the reference signal in the first direction and to the second state when the magnitude of the adjusted output signal transcends the magnitude of the reference signal in the second direction to generate a supplemental flag state;
   comparing the supplemental flag state with the stored initial flag state; and
   concluding the calibration sequence when the supplemental flag state and the stored initial flag state are different.

17. A method of calibrating a line driver circuit, the method including the steps of:
   sampling an output signal from a line driver circuit;
   holding a sampled signal representative of the output signal from the line driver circuit;
   comparing a magnitude of the held signal representative of the output signal with a magnitude of a reference signal;
   incrementing a counter a predetermined amount when the magnitude of the held signal representative of the output signal transcends the magnitude of a reference signal;
   generating a calibration signal corresponding to the predetermined amount; and
   combining the calibration signal with an input signal to the line driver circuit to calibrate the magnitude of the output signal with respect to the magnitude of the reference signal.

18. A method of calibrating a line driver circuit, the method including the steps of:
   sampling an output signal from a line driver circuit;
   holding a sampled signal representative of the output signal from the line driver circuit;
   comparing a magnitude of the held signal representative of the output signal with a magnitude of a reference signal;
   setting a flag to a first state when the magnitude of the held signal transcends the magnitude of the reference signal in a first direction and to a second state when the magnitude of the held signal transcends the magnitude of the reference signal in a second direction, to generate an initial flag state and initiate a calibration sequence;
   storing the initial flag state;
   combining a calibration signal with an input signal to the line driver circuit to adjust a magnitude of the output signal with respect to the magnitude of the reference signal, the calibration signal having a first polarity when the magnitude of the held signal transcends the reference signal in a first direction and a second polarity when the held value transcends the reference signal in a second direction;
   generating an adjusted output signal from the line driver in accordance with the calibration signal;
   sampling the adjusted output signal from the line driver circuit;
   holding a sampled adjusted signal representative of the adjusted output signal from the line driver circuit;
   comparing a magnitude of the held sampled signal with the magnitude of the reference signal;
   setting the flag to the first state when the magnitude of the held sampled adjusted signal transcends the magnitude of the reference signal in the first direction and to the second state when the magnitude of the held sampled adjusted signal transcends the magnitude of the reference signal in a second direction to generate a supplemental flag state;
   comparing the supplemental flag state with the stored initial flag state; and
   concluding the calibration sequence when the supplemental flag state and the stored initial flag state are different.

19. The method of claim 18 further comprising the step of selecting one of a 10 Meg calibrate mode and a 100 Meg calibrate mode.

* * * * *